United States Patent [19]
Paddock et al.

[11] 3,904,023
[45] Sept. 9, 1975

[54] APPARATUS TO ORGANIZE A MASS OF OBJECTS INTO A TRAVELLING ROW

[75] Inventors: Paul F. Paddock, Riverside; Jerry W. Cramer, Upland, both of Calif.

[73] Assignee: Sunkist Growers, Inc., Sherman Oaks, Calif.

[22] Filed: Oct. 10, 1972

[21] Appl. No.: 295,915

[52] U.S. Cl. .................. 198/106; 198/24; 198/32
[51] Int. Cl. ............................................. B65g 37/00
[58] Field of Search ........ 198/32, 106, 24, 179, 20, 198/26

[56] References Cited
UNITED STATES PATENTS

| | | | |
|---|---|---|---|
| 2,799,414 | 6/1959 | Streckfuss | 198/24 X |
| 3,220,154 | 11/1965 | Van Der Schoot | 73/203 |
| 3,262,542 | 7/1966 | McClelland | 198/32 |
| 3,306,422 | 2/1967 | Bivans | 198/179 X |
| 3,370,691 | 2/1968 | Mosterd | 198/20 X |
| 3,543,908 | 12/1970 | Holland | 198/26 |

FOREIGN PATENTS OR APPLICATIONS

| | | | |
|---|---|---|---|
| 16,503 | 9/1912 | Denmark | 198/179 |

*Primary Examiner*—James B. Marbert
*Assistant Examiner*—Douglas D. Watts
*Attorney, Agent, or Firm*—Paul A. Weilein

[57] ABSTRACT

A continuously running single-row conveyor delivers N number of objects in a time period T. A shuttle reciprocating at the rate of one reciprocation per T, accelerates in the direction of travel of the conveyor to drop a row of N objects onto the conveyor. The shuttle is reciprocated by a continuously driven epicyclic train that causes the shuttle to pause at its starting position. A cyclic loader replenishes the shuttle at the starting position and, in turn, is replenished by supply means that organizes a bulk supply of the objects into N parallel travelling rows with the objects in the parallel longitudinal rows forming transverse rows of N objects each. The supply means operates step by step to deliver the successive transverse rows of N objects to the cyclic loader.

23 Claims, 18 Drawing Figures

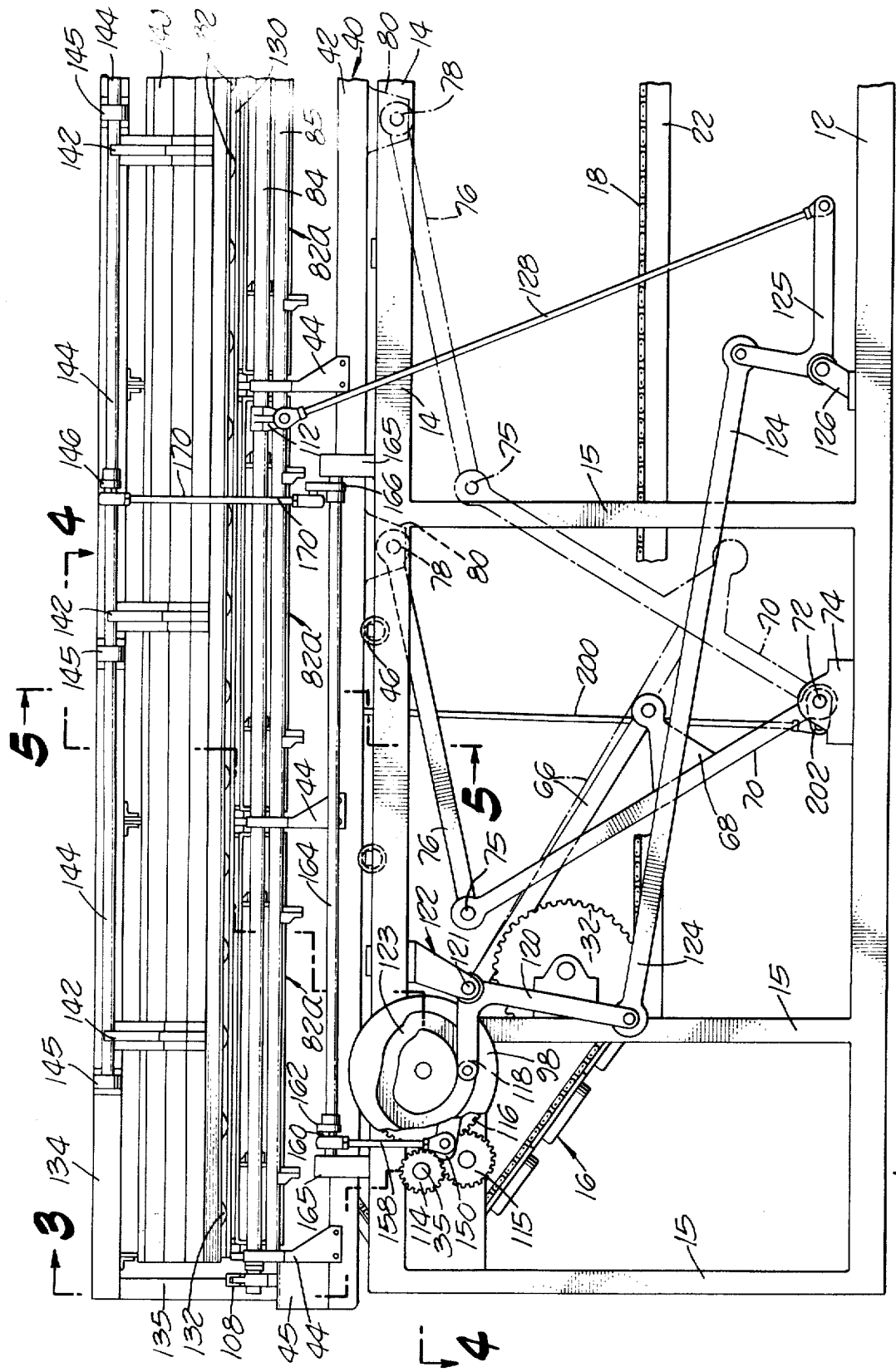

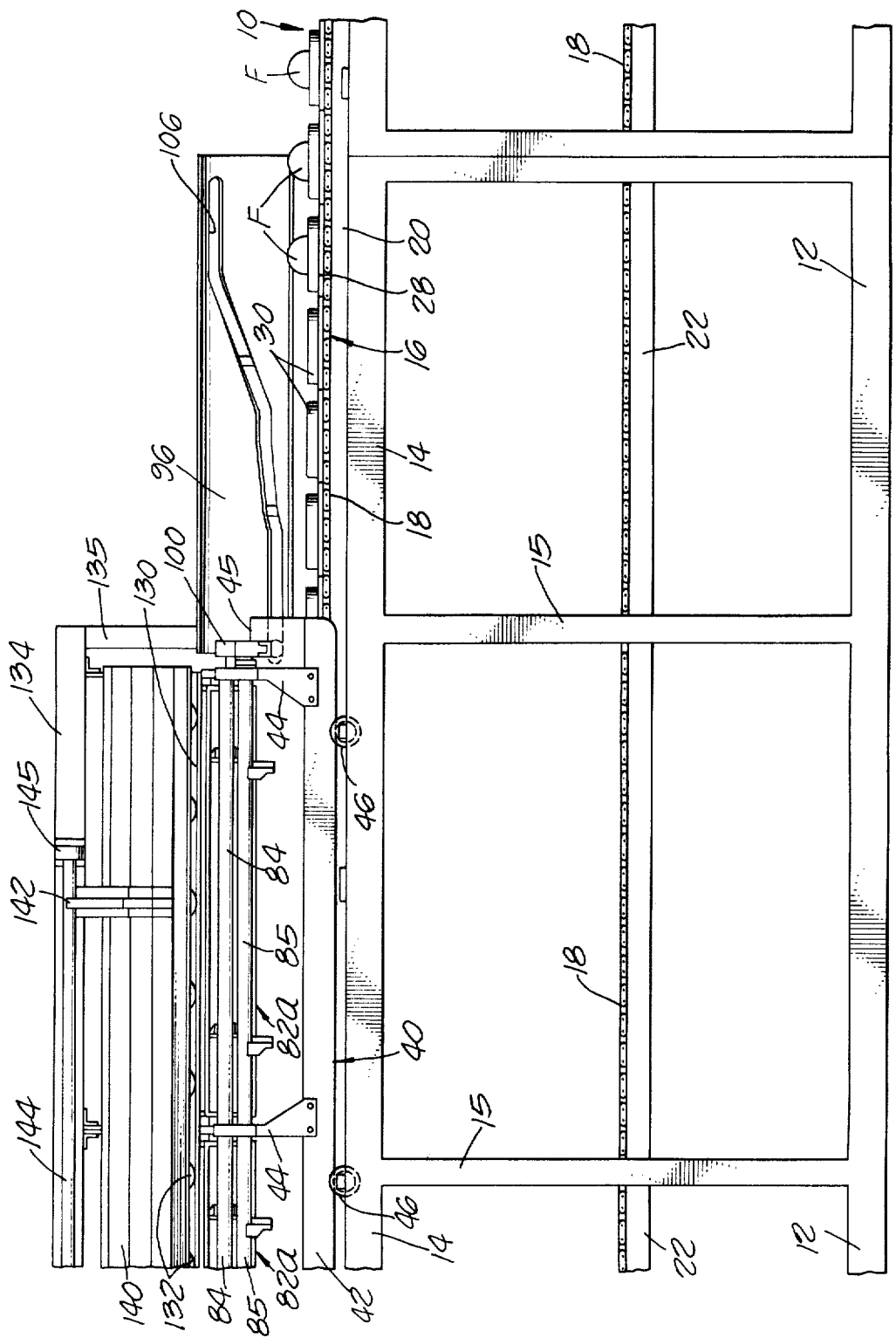

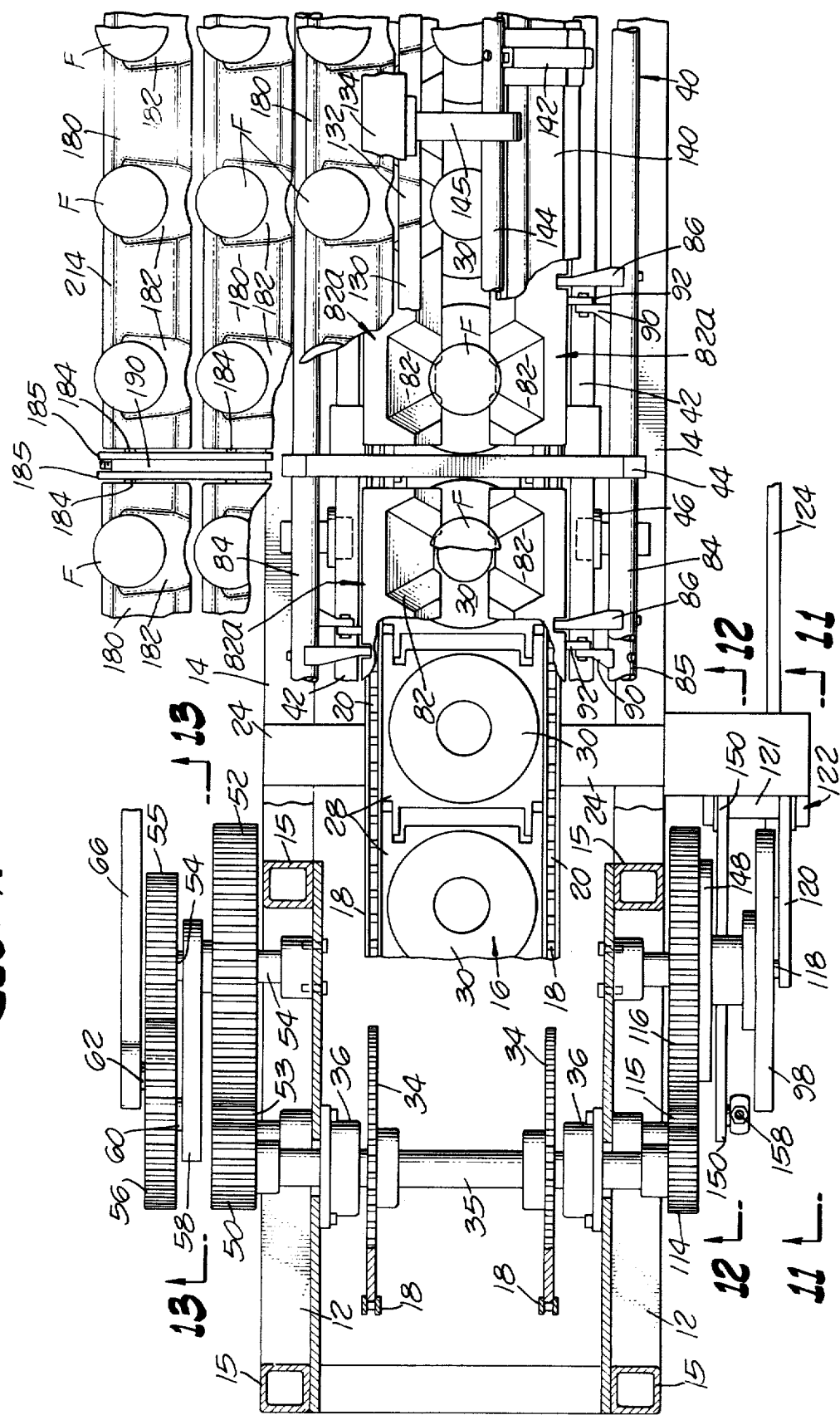

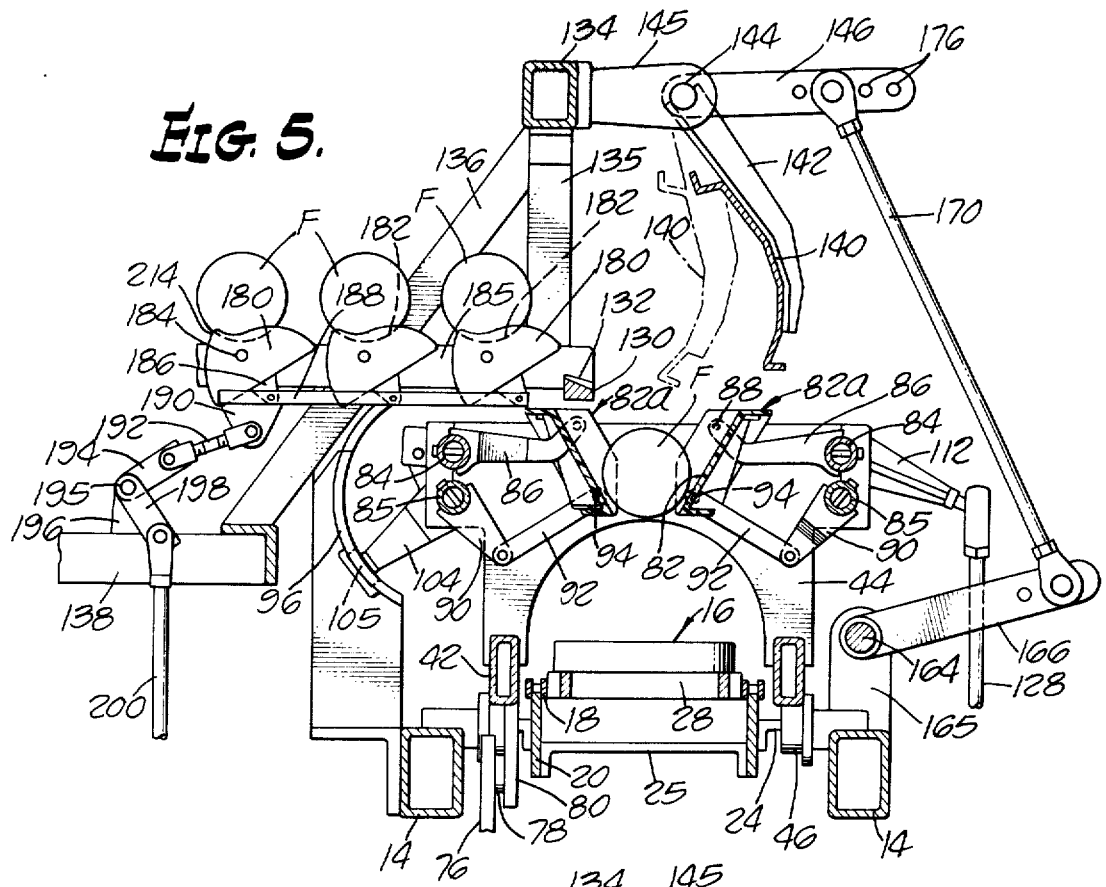
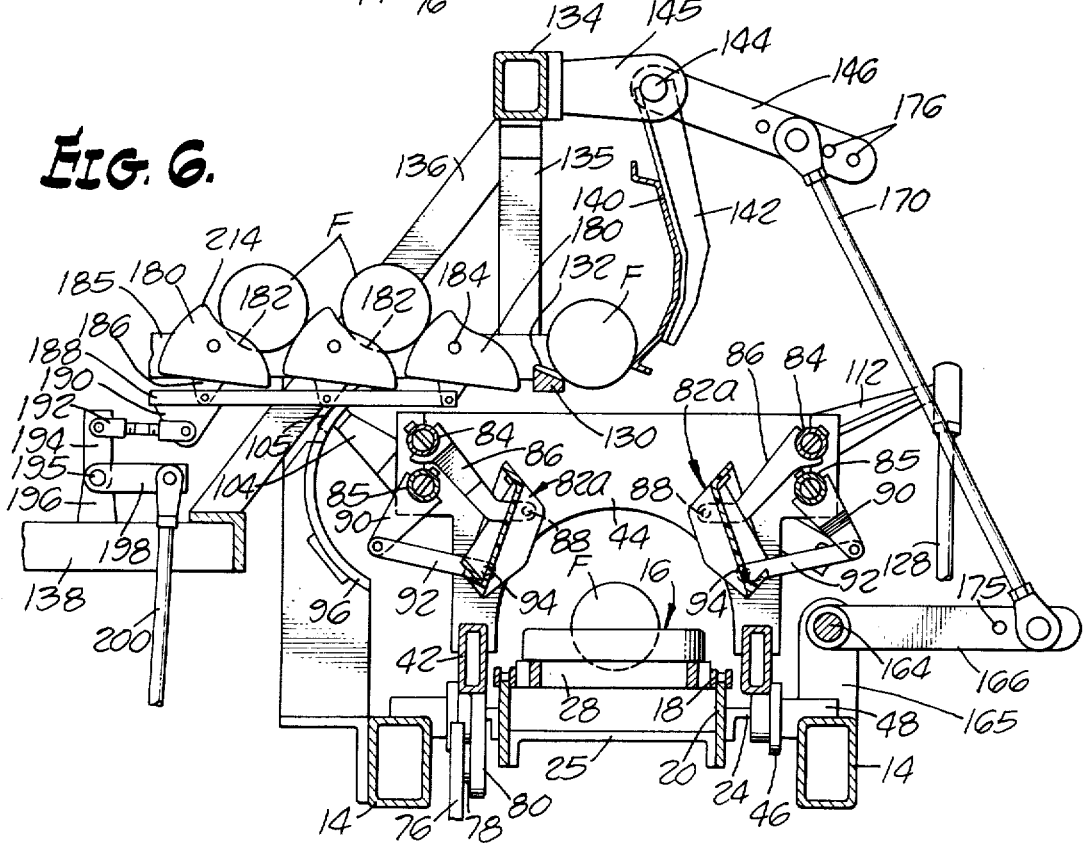

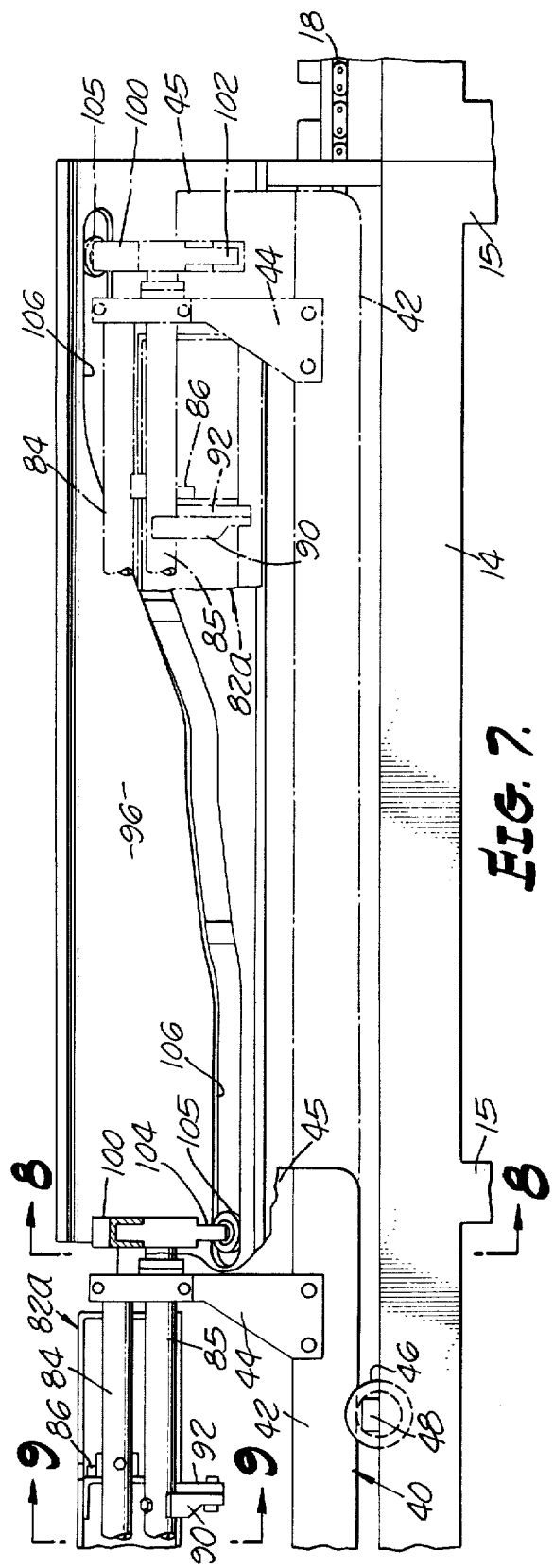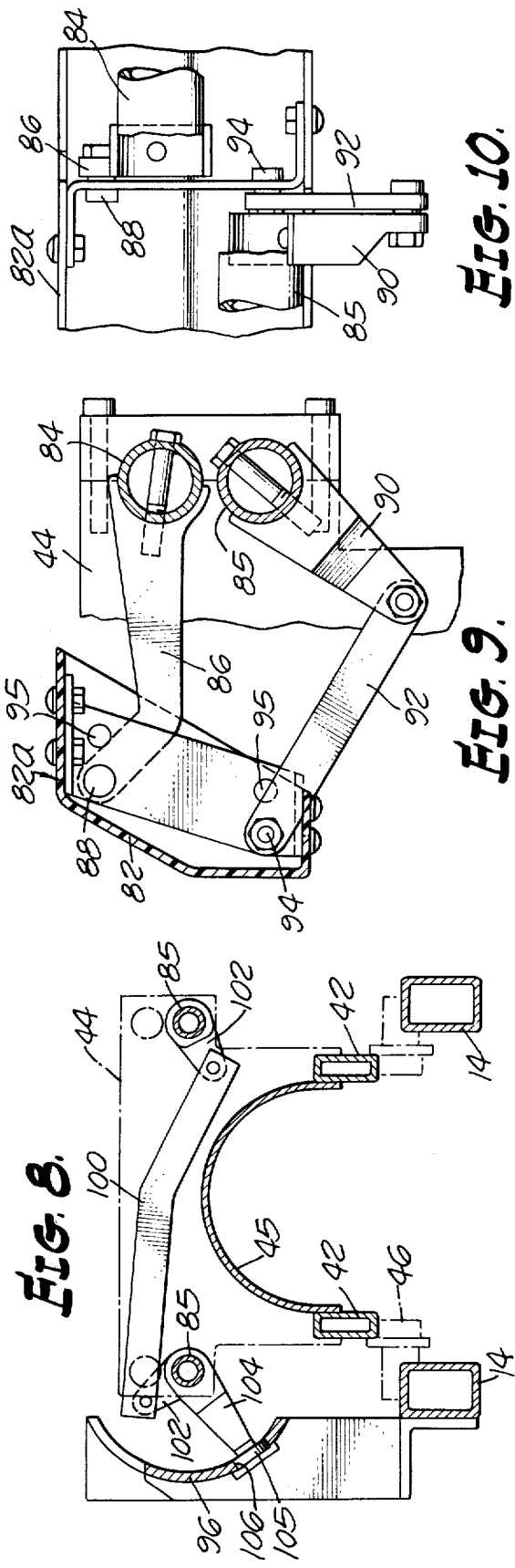

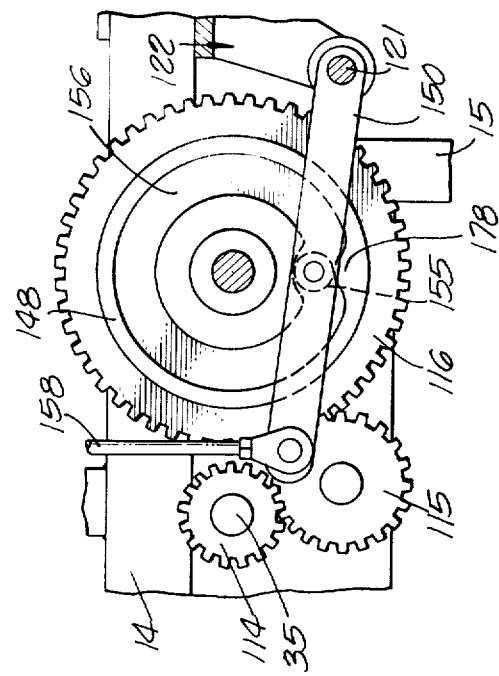
Fig. 12.
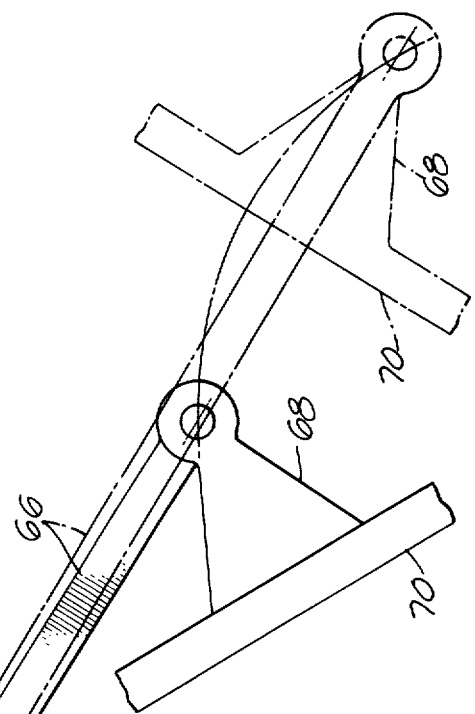
Fig. 11.
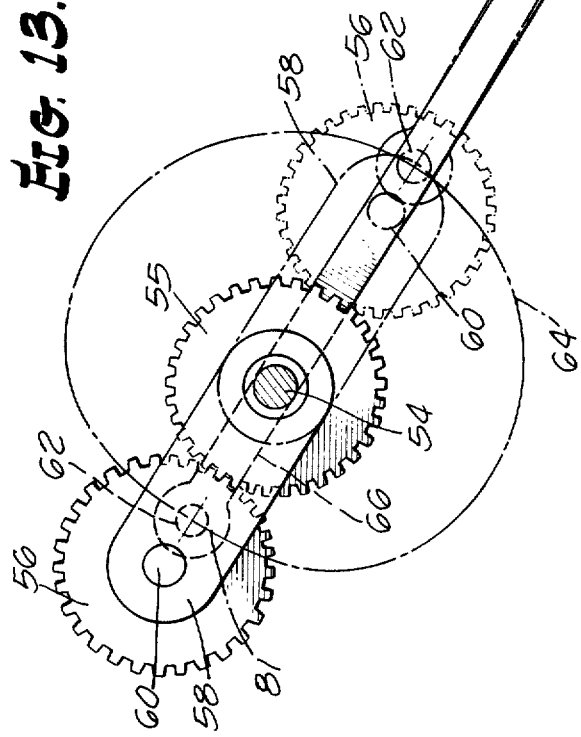
Fig. 13.
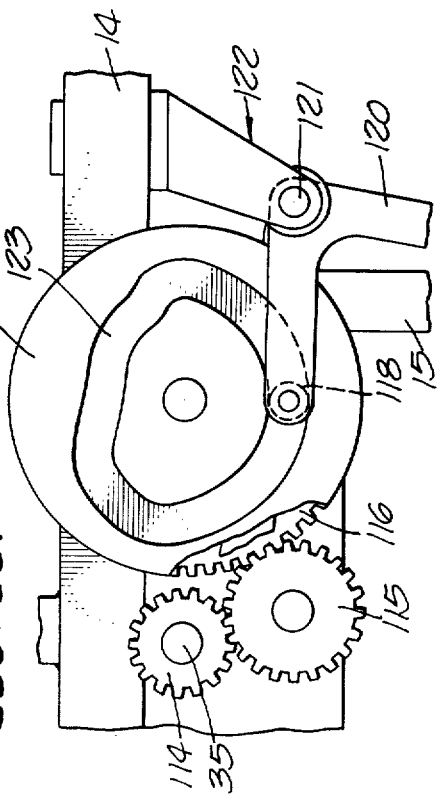

APPARATUS TO ORGANIZE A MASS OF OBJECTS INTO A TRAVELLING ROW

BACKGROUND OF THE INVENTION

In various situations in various arts objects must be handled sequentially from a bulk supply in an expeditious manner at relatively low cost. For example, it may be desired that bulk components be handled sequentially for inspection or for further processing.

Another example is found in a packing plant where fruit taken from a bulk supply is moved sequentially into a processing zone where the fruit is inspected for rejects and is then classified into different grades or different sizes. Since it is mandatory that the fruit be handled rapidly at low cost, it would be prohibitive to rely on manual labor to take the individual fruit from the bulk supply and inspect and classify the fruit.

The problem is to develop a power-actuated handling system for this purpose that can be relied upon to operate efficiently and reliably at high speed and lost cost. Various apparatus have been developed to carry out part or all of such a handling procedure but the need remains for a satisfactory apparatus and especially an apparatus that can keep up with recently developed techniques for inspecting and classifying fruit at a faster rate than heretofore possible.

SUMMARY OF THE INVENTION

The initial embodiment of the invention disclosed herein is designed to handle citrus fruit and to move the fruit into a processing zone where the fruit is inspected and classified. The fruit is moved sequentially at a high rate which may be expressed as N number of fruit per time period T. For example, a presently satisfactory high rate is 20 fruit in a time period of 2 seconds which means 600 fruit per minute or 36,000 fruit per hour.

A single-row conveyor with the fruit at a given spacing thereon travels into the processing zone at the required rate of N per T and a shuttle holding a feed row of N fruit at the given spacing reciprocates lengthwise of the conveyor at a frequency of one reciprocation per T. Pausing momentarily at a starting position at one end of its range of reciprocation to receive a new feed row of fruit and to permit the newly loaded fruit to stabilize, the shuttle accelerates to substantially the same velocity as the conveyor parallel to the path of the conveyor and then dwells briefly to transfer its feed row of N objects smoothly onto the conveyor.

The shuttle is actuated by a power-driven epicyclic train that operates continuously in such manner as to cause the reciprocating shuttle to pause for an adequate time period at its starting position. For this purpose a crank on the epicyclic train is operatively connected to the shuttle and travels in an epicycloidal orbit that is flattened to the required degree in the end region of the orbit that corresponds with the starting position of the shuttle.

A cyclic loader synchronized with the shuttle has a capacity of one row of N fruit and releases such a row to the shuttle each time the shuttle pauses at its starting position. To replenish the cyclic loader, suitable supply means organizes the fruit from a bulk supply into parallel longitudinal rows that travel longitudinally towards the cyclic loader. The fruit in the N parallel longitudinal rows form a series of transverse rows of N fruit and the supply means operates step by step in synchronization with the cyclic loader to deliver a transverse row of N fruit to the loader on each operating cycle.

In the presently preferred practice of the invention, the supply means is in the form of an intermittent conveyor of the general character disclosed in the copending application, Ser. No. 132,444 entitled CONVEYOR WITH ROCKING UNITS TO ROLL ROUND ARTICLES, filed by Paul F. Paddock on Apr. 8, 1971.

The intermittent supply conveyor comprises a series of conveyor units extending transversely of the desired N parallel longitudinal rows with each unit having N seats for individual fruit to form the N parallel longitudinal rows. The conveyor units extend edge to edge in the direction of the longitudinal parallel rows and continuously rock to advance the parallel rows step by step and thus deliver successive transverse rows of N fruit to the cyclic loader.

The features and advantages of the invention may be understood by reference to the following detailed description and the accompanying drawings.

BRIEF DESCRIPTION OF THE DRAWINGS

In the drawings, which are to be regarded as merely illustrative:

FIGS. 2A and 2B together constitute a side elevational view of the preferred embodiment on a larger scale;

FIG. 4 is a fragmentary longitudinal section on a larger scale as seen along the angular line 4—4 of FIG. 2A;

FIG. 5 is a transverse sectional view along the angular line 5—5 of FIG. 2A showing fruit released from the cyclic loader to the shuttle;

FIG. 6 is a view similar to FIG. 5 showing the fruit released from the shuttle to the single row conveyor under the shuttle and showing the cyclic loader replenished with a new row of fruit;

FIG. 7 is an enlarged side elevational view of a barrel cam that actuates a portion of the shuttle mechanism in response to reciprocation of the shuttle;

FIG. 8 is an enlarged fragmentary section along the line 8—8 of FIG. 7 showing how the shuttle cooperates with the barrel cam;

FIG. 9 is a fragmentary transverse section as seen along the line 9—9 of FIG. 7 showing how a pair of actuating shafts is operatively connected to a jaw structure of the shuttle;

FIG. 10 is a fragmentary elevational view of the structure shown in FIG. 9;

FIG. 11 is a fragmentary sectional view along the line 11—11 of FIG. 4 showing a cam and follower that control a longitudinal shaft on the shuttle;

FIG. 12 is a fragmentary sectional view along the line 12—12 of FIG. 4 showing a cam and follower that control a gate of the cyclic loader for the shuttle;

FIG. 13 is a fragmentary sectional view along the line 13—13 of FIG. 4 showing an epicyclic train for reciprocating the shuttle.

DESCRIPTION OF THE PRESENTLY PREFERRED EMBODIMENT OF THE INVENTION

Figure 1:
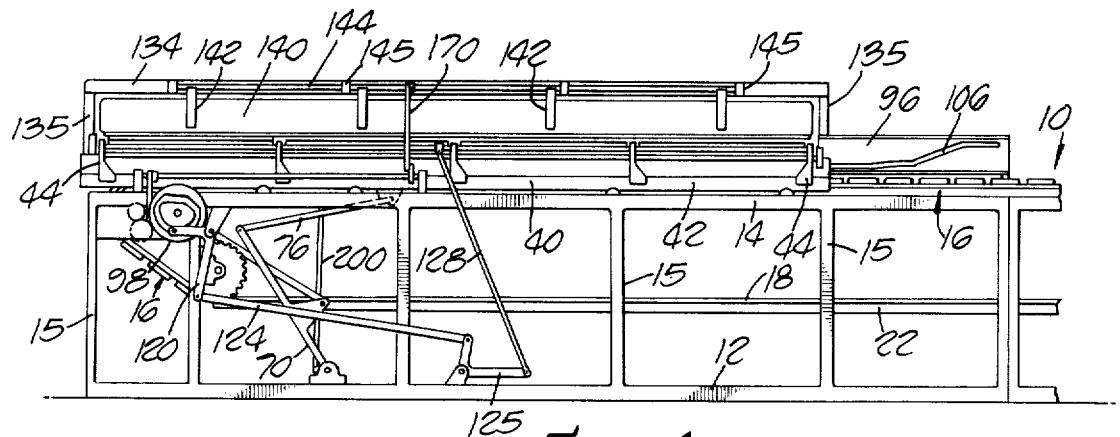
FIG. 1 is a side elevational view on a reduced scale illustrating the presently preferred embodiment of the invention.

The purpose of the apparatus shown in the drawings is to withdraw citrus fruit from a bulk supply and to cause the individual fruit, which are designated F, to travel rapidly in single file into a processing zone. The beginning or entrance of the processing zone is indicated by numeral 10 in FIGS. 1 and 2B.

Figure 3:
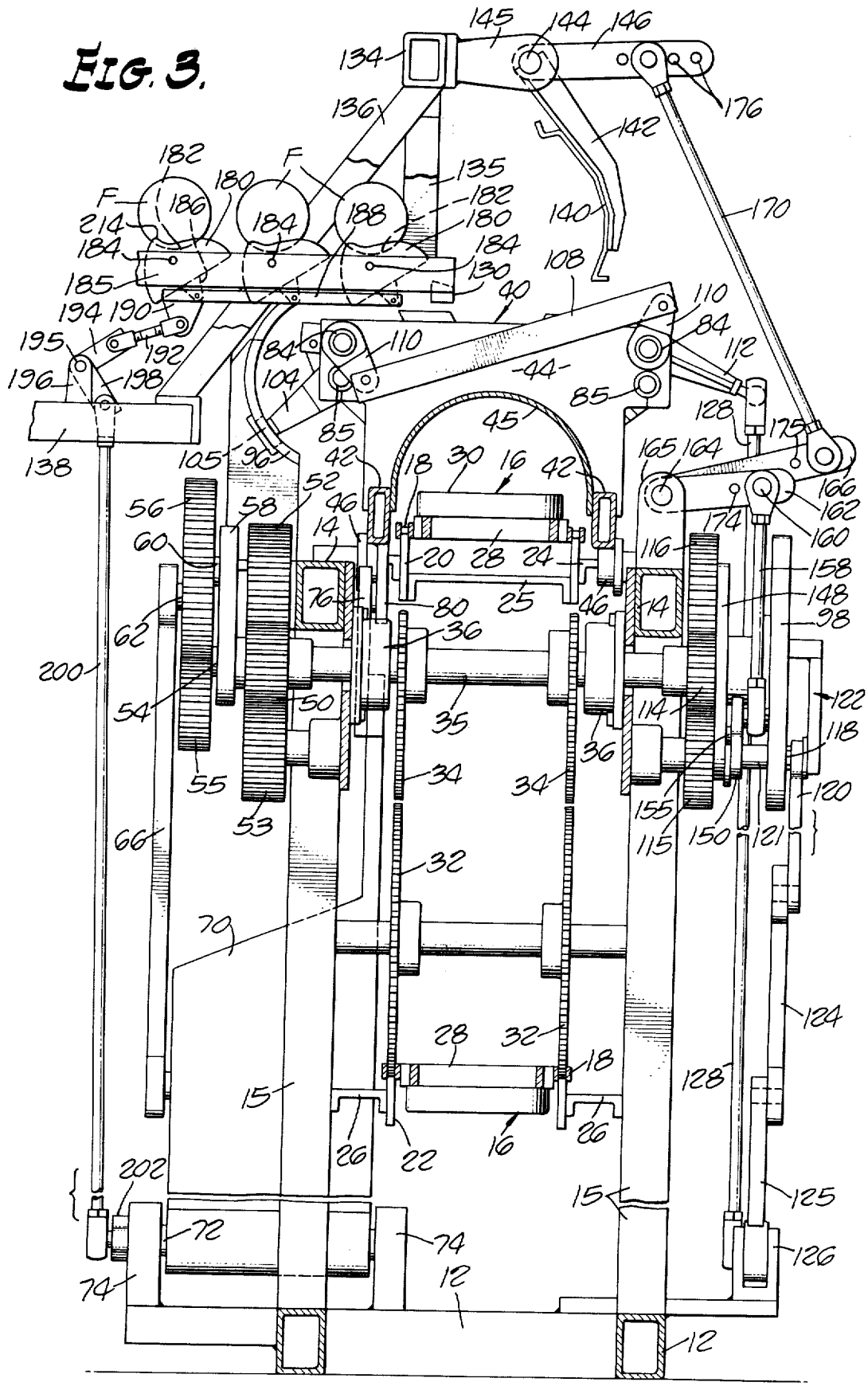
FIG. 3 is a transverse sectional view of the apparatus as seen along the angular line 3—3 of FIG. 2A.

The moving parts of the apparatus are mounted on a longitudinal frame that includes a base 12 and a pair of parallel spaced hollow longitudinal beams 14 that are shown in section in FIG. 3 and are supported by a plurality of legs 15 that extend upward from the base.

A single-row conveyor, generally designated 16, comprises a pair of parallel sprocket chains 18, the upper runs of the two sprocket chains riding on an upper pair of longitudinal guide rails 20 (FIG. 3), the lower runs of the sprocket chains riding on a pair of lower guide rails 22. The upper guide rails 20 are mounted on two longitudinal beams 14 respectively by brackets 24 with the guide rails interconnected by transverse members 25. The lower guide rails 22 are mounted on brackets 26 on the legs 15 of the frame. A continuous series of carriers 28 are pivotally connected to the two sprocket chains 18 in a well known manner and each carrier provides a circular seat 30 for an individual citrus fruit.

At the receiving end of the single-row conveyor the two sprocket chains 18 engage the undersides of a pair of idler sprockets 32 and then engage an upper pair of driven sprockets 34 (FIG. 3) to begin the upper run of the conveyor. At the other end of the conveyor (not shown) a pair of sprockets corresponding to driven sprockets 34 are power driven to actuate the single-row conveyor. The driven sprockets 34 actuate a driven shaft 35 on which they are mounted and the driven shaft, which is journalled in suitable bearings 36, drives various moving parts of the apparatus in synchronism with the single-row conveyor.

A shuttle, generally designated 40, that reciprocates longitudinally of the apparatus frame comprises a pair of spaced hollow longitudinal rails 42 interconnected by spaced upright supports 44 that arch over the single-row conveyor 16. The two upright supports 44 at the opposite ends of the shuttle are provided with semicylindrical skirts 45 which also arch over the single-row conveyor 16. The shuttle 40 is movably supported by a series of pairs of flanged rollers 46 which engage and guide the side rails 42 and which are journalled in bearings 48 on the longitudinal beams 14 of the apparatus.

The previously mentioned driven shaft 35 of the single-row conveyor reciprocates the shuttle 40 by a mechanism that includes a gear 50 (FIGS. 3 and 4) on one end of the driven shaft, which gear drives a larger gear 52 through an idler gear 53. The larger gear 52 is journalled on a fixed stub shaft 54 that carries on its outer end a fixed sun gear 55 of an epicyclic train that includes a planet gear 56 of the same diameter as the sun gear. The larger gear 52 carries a radial arm 58, the outer end of which carries a spindle 60 that carries the planet gear. The planet gear 56 is provided with a crank 62 which operates the shuttle and which, as indicated diagrammatically in FIG. 13, travels in an epicycloidal orbit 64.

The crank 60 is pivotally connected to a long link 66 which, in turn, is pivotally connected to a lateral arm 68 of a second link 70. As best shown in FIG. 3, the link 70 is widened at its lower end and is fixedly mounted on a short shaft 72 that is journalled in spaced brackets 74 on the base 12 of the apparatus frame. Thus, the link 66 not only rocks the link 70, but also oscillates the shaft 72 on each cycle of operation of the shuttle. As best shown in FIG. 2A, the upper end of the link 70 is connected by a pivot 75 to a third link 76 that is connected by a pivot 78 to a downwardly extending ear 80 of the shuttle. The links 70 and 76 constitute a pair of knee-action links for transmitting reciprocating motion to the shuttle.

With the single row conveyor 16 travelling at a rate to deliver 20 citrus fruit to the zone 10 every 2 seconds, the shuttle 40 is provided with suitable fruit handling mechanism to receive a row of 20 citrus fruit at the starting position of the shuttle and to deposit the row of 20 fruit on the single row conveyor when the shuttle is accelerated to substantially the velocity of the conveyor.

It is important to note in FIG. 13 that with the planet gear 56 of the same diameter as the sun gear 55, the planet gear makes one complete rotation on its axis in response to one complete circuit of the planet gear around the circumference of the sun gear, and it is further important to note that at one end of the orbit 64 corresponding to the starting position of the reciprocating shuttle 40, the crank 62 is at minimum distance from the axis of the sun gear. Thus, the end of the orbit 64 that is indicated by numeral 81 (FIG. 13) and that corresponds to the starting position of the shuttle is flattened, because the arc of travel of the crank about the axis of the planet gear is opposite to the arc of travel of the planet gear about the axis of the sun gear, the two arcs negating each other to cause the shuttle to make a pause preceptibly at its starting position. The crank is accelerated in its orbital movement to maximum velocity at the end of its first quarter of rotation from the starting position shown in FIG. 13, because at that point each arc of travel has maximum effect on the velocity of the shuttle and the two arcs are additive to accelerate the shuttle to approximately the constant velocity of the single-row conveyor to permit the row of fruit on the shuttle to be transferred to the single-row conveyor. Since the rate of change of the velocity of the shuttle is quite low both immediately before and immediately after the point of maximum velocity, the shuttle, in effect, dwells at approximately the velocity of the single-row conveyor to facilitate the transfer of fruit to the single-row conveyor.

The range of reciprocation of the shuttle is substantially the horizontal dimension of the cam groove 106 of the barrel cam 96 and it can be seen in FIG. 1 that the cam groove is only about a fourth of the length of the shuttle. Thus, although the shuttle is long enough to hold a row of 20 fruit, it reciprocates a distance equal to only five fruit in a row. The short range of reciprocation facilitates the required high frequency of the reciprocation. It is also apparent from an inspection of the orbit 64 in FIG. 13 that the movement of the shuttle is substantially sinusoidal with gradual deceleration and acceleration at each end of its stroke to reduce stresses arising from the inertia of the shuttle.

The fruit-handling mechanism on the shuttle may take various forms in various practices of the invention. In the construction shown in the drawings, referring first to FIGS. 4–6, the fruit-handling mechanism on the shuttle 40 comprises cyclic holding means wherein 20 releasable fruit holders or split cups in the form of 20 pairs of jaws 82 that move cyclically between fruit-holding positions shown in FIG. 5 and open position shown in FIG. 6 to release the 20 fruit to 20 empty carriers 28 on the single-row conveyor 16. Each row of 20 jaws 82 is divided into four groups of five jaws each, and, as indicated in FIG. 4, the five jaws of each group are united in a single jaw structure 82a.

Referring to FIG. 6, the four right hand jaw structures 82a are controlled by an upper longitudinal shaft 84 and a cooperating lower longitudinal shaft 85 on the right hand side of the shuttle and in like manner the row of four left hand jaw structures is controlled by an upper left longitudinal shaft 84 and a lower left longitudinal shaft 85 on the left hand side of the shuttle. Each of the two upper longitudinal shuttle shafts 84 has a pair of longitudinally spaced arms 86 to support each of the corresponding four jaw structures 82a, the outer ends of the pairs of arms being connected to the jaw structure by pivots 88. Each of the lower shafts 85 carries a pair of longitudinally spaced arms 90 for each jaw structure 82a, each arm 90 being pivotally connected to a corresponding link 92 that in turn is connected to the corresponding jaw structure by pivot means 94.

The cycle of operation of the pairs of jaw structures 82a by the two pairs of shafts 84 and 85 may be understood by reference to FIGS. 14–17 which illustrate successive stages in the operating cycle.

Figure 14:
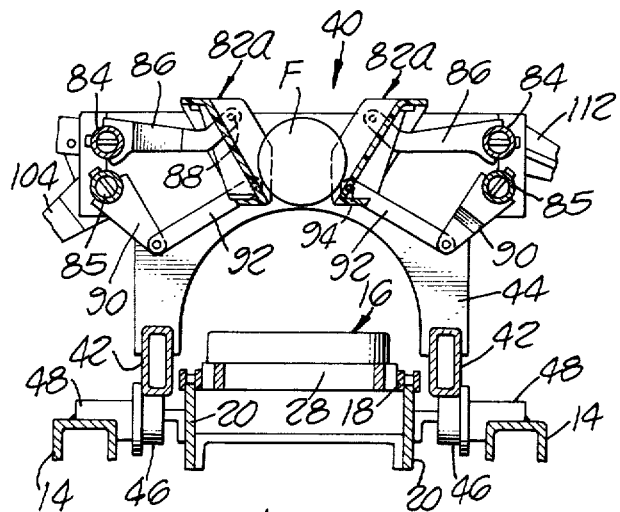
FIGS. 14–17 are sectional views showing successive stages in the operation of a pair of jaw structures on the shuttle.

FIG. 14 shows a pair of jaw structures 82a in their upper fruit-holding positions at which they cooperate to form five downwardly tapered seats for the fruit. The jaw structures may be adjusted for fruit of different sizes and for this purpose, as indicated in FIG. 9, each jaw structure 82a may be provided at its opposite ends with a plurality of circular apertures 95 in which the pivot means 88 and 94 may be mounted selectively.

Figure 15:
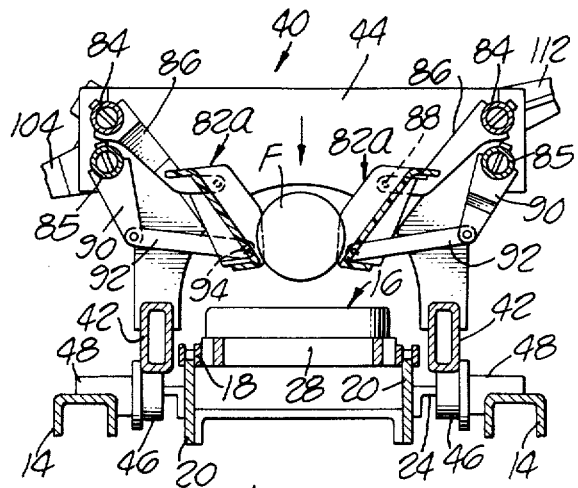

FIG. 15 shows how, starting from the position shown in FIG. 14, a pair of jaw structures 82a lower the fruit F progressively towards the underlying single-row conveyor 16 to minimize the distance of free fall of the fruit and thereby minimize impact damage to the fruit.

Figure 16:
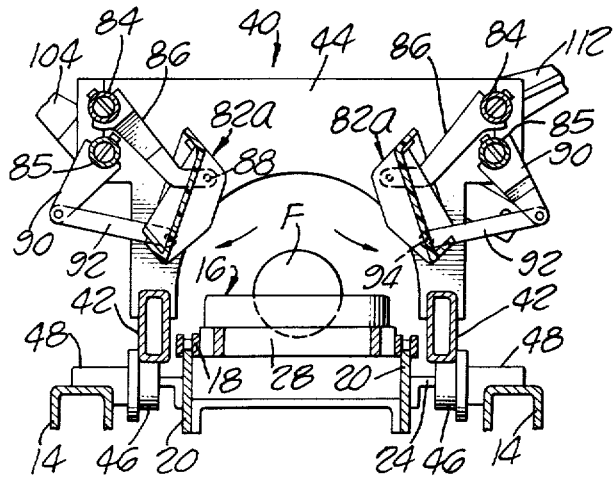
Figure 17:
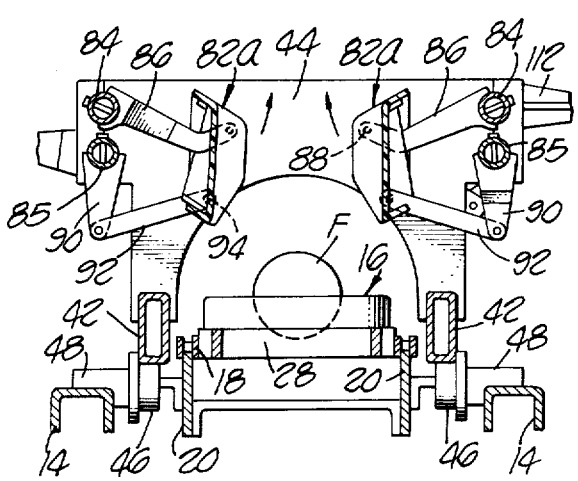

FIG. 16 shows the fruit F released to the single-row conveyor and when the fruit is released in this manner it is mandatory that the pair of jaw structure 82a immediately retract clear of the path of travel of the fruit on the single-row conveyor. FIG. 16 shows how the two jaw structures are immediately retracted laterally from the path of travelling fruit, and FIG. 17 shows how the two jaw structures then converge towards each other as they return to the upper starting positions shown in FIG. 14.

It is apparent from FIGS. 14–16 that the two jaws of each pair move in individual orbits with the two jaws relatively close together in fruit-holding state as they descend and with the two jaws spreading apart at their lower positions to return at relatively wide spacing. The jaws are close enough to the single-row conveyor at their lower positions to avoid impact damage to the fruit when the jaws spread to their releasing states.

Since ten of the carriers 28 of the single-row conveyor 16 pass any given point in one second, it is apparent that when a pair of jaws 82 release a fruit onto the carrier, the two jaws have not more than one-tenth second to withdraw sufficiently to avoid interferring with fruit on the next following carrier. The sequence of FIGS. 15, 16 and 17 show how a pair of jaws in releasing a fruit to the single-row conveyor quickly spread apart and rise to clear the next oncoming fruit.

Various expedients may be employed in various practices of the invention to control the two pairs of shafts 84, 85 to carry out the described operating cycle shown in FIGS. 14–17. In the present embodiment of the invention a fixed barrel cam 96 (FIGS. 2B and 7) is positioned adjacent the path of reciprocation of the shuttle to control the lower longitudinal shafts 85 and a rotary cam 98 (FIGS. 2A and 12) remote from the shuttle controls the two upper shafts 84 of the shuttle.

As shown in FIG. 8, the two lower shafts 85 on the opposite sides of the shuttle 40 are interconnected by a transverse link 100 which is pivotally connected to radial arms 102 on the two shafts. The left hand shaft 85 in FIG. 8 has a radial operating arm 104 on the outer end of which is mounted a follower in the form of a roller 105 which, as best shown in FIG. 7, traverses a longitudinal cam groove 106 of the barrel cam 96. As shown in FIG. 3, the two upper shafts 84 on the shuttle are interconnected by a link 108 that is pivoted to two radial arms 110 on the two shafts respectively and the two shafts are actuated by a radial operating arm 112 on the right hand shaft 84.

Referring to FIGS. 3, 4, and 11, a gear 114 on the second end of the driven shaft 35 drives a gear 115 which in turn drives a larger gear 116 that carries the rotary cam 98. A follower in the form of a roller 118 is carried by one arm of a bell crank 120 (FIGS. 2A, 3, and 11) which is pivotally mounted on a fixed shaft 121 that is carried by a bracket 122, the roller following a cam groove 123 in the face of the cam 98. As shown in FIG. 2A, the second arm of the bell crank 120 is connected by a long link 124 to one arm of a second bell crank 125 that is pivotally mounted on a bracket 126 on the base of the apparatus frame. The second arm of the second bell crank 125 is connected by a long link 128 to the operating arm 112 on the right hand lonitudinal shaft 84 of the shuttle. Thus, the link 128 swings through an arc to follow the reciprocation of the shuttle and the cam groove 122 causes the link 128 to oscillate the arm 112, the cam groove being shaped to compensate for the changing angle of the link relative to the reciprocating shuttle.

Positioned above the starting position of the shuttle is what may be termed a cyclic loader which deposits a row of 20 fruit on the shuttle each time the shuttle pauses at its starting position. In the construction shown, the cyclic loader includes a stationary longitudinal bar 130 with 20 spaced recesses 132 to seat individual fruit. The longitudinal bar 130 is shown in transverse section in FIGS. 3–6 and in side elevation in FIGS. 2A and 2B and a fragment of the longitudinal bar is shown in plan in FIG. 4. The longitudinal bar 130 of the cyclic loader is mounted on framework that includes a hollow overhead beam 134 (FIGS. 3, 4, and 6), vertical frame members 135, diagonal frame members 136, and a lower horizontal frame member 138.

Cooperating with the longitudinal bar 130 to complete the cyclic loader is a longitudinal sheet metal gate 140 of the same length as the horizontal bar. The gate is mounted by spaced arms 142 on an overhead rocker shaft 144 that is journalled in a series of brackets 145 on the overhead beam 34. The rocker shaft 144 oscillates the gate 140 between a holding position shown in FIG. 6 and a release position shown in FIGS. 3 and 5.

At its holding position the gate 140 cooperates with the longitudinal bar 130 to releasably retain 20 fruit in the 20 seats or recesses 132 and when the gate swings to its open position the fruit drop through a very short distance into the pairs of fruit holder jaw structures 82a of the shuttle which are then positioned immediately below the longitudinal bar 130 to avoid impact damage to the fruit.

The pause at the starting position of the shuttle is of sufficient duration to permit the newly deposited fruit to settle or stabilize in the split cups or pairs of jaw structures 82a as required for smooth transfer of the fruit to the single-row conveyor when the split cups subsequently open.

The rocker shaft 144 is controlled by a radial operating arm 146 which is actuated by a remote cam 148 shown in FIGS. 3, 4, and 12. As shown in FIG. 4, the cam 148 is integral with the same gear 116 that carries the previously mentioned cam 98. As best shown in FIG. 12 a lever 150 pivoted on the previously mentioned fixed shaft 121 carries at an intermediate point a roller 155 that follows a cam groove 156 in the face of the cam 148. The outer swinging end of the lever 150 is pivotally connected to the lower end of a link 158. As indicated in FIG. 2A, the link 158 is connected by a pivot 160 to a rocker arm 162 on a rocker shaft 164 which is journalled in a pair of longitudinally spaced fixed brackets 165 on the apparatus frame. A radial arm 166 on the far end of the rocker shaft 164 is pivotally connected to the lower end of a link 170, the upper end of which is pivotally connected to the previously mentioned operating arm 146 of the overhead rocker shaft 144. As shown in FIG. 3, the rocker arm 162 has a plurality of apertures 174 to be used selectively for pivotal connection to link 162; the rocker arm 166 has a plurality of apertures 175 for selective pivotal connection to link 170; and the operating arm 146 has a plurality of apertures 176 to be used selectively for pivotal connection to link 170. This arrangement permits adjustment of the gate 140 relative to the longitudinal bar 130 as required for different sizes of fruit. The cam and linkage synchronizes the gate 140 to release the fruit to the shuttle when the shuttle pauses at its starting position. As may be seen in FIG. 12, the cam groove 156 is concentric with the axis of rotation of the cam 148 to keep the gate 140 stationary for the major portion of the operating cycle, the groove having a short offset 178 at a single point in its circumference to cause the gate to swing to open position when the shuttle pauses at its starting position.

The cyclic loader comprising the longitudinal bar 130 and the gate 140 may be replenished on each operating cycle by various means in various practices of the invention. A feature of the present embodiment of the invention is the use for this purpose of a cyclic feed conveyor of the general character disclosed in the previously mentioned copending application, which cyclic conveyor takes fruit from a bulk supply and organizes the fruit into 20 parallel rows that advance longitudinally step by step towards the cyclic loader.

As indicated in FIG. 3, the cycylic conveyor comprises a plurality of conveyor units 180 each of which provides five spaced seats 182 (FIG. 4) for the individual fruit. Since 20 longitudinal rows of the fruit are required, the conveyor units 180 are arranged in four longitudinal rows with the conveyor units abreast of each other. Thus, four of the conveyor units abreast of each other provide a transverse row of 20 fruit and the assemblage of transverse conveyor units provides 20 longitudinal rows of fruit with the longitudinal rows of fruit advancing step by step to present successive transverse rows of fruit to the cyclic loader.

Each of the conveyor units 180 providing five seats for fruit is pivotally mounted by trunnions 184 on a pair of spaced longitudinal frame members 185 and the four units of each set of four abreast units rock in unison about the axes of the four sets of trunnions. Each conveyor unit 180 has a downwardly extending ear 186 (FIG. 3) and each longitudinal row of the ears 186 is pivotally connected to a corresponding longitudinal operating bar 188 that is supported by the ears. Each of the longitudinal operating bars 188 is provided with a similar downwardly extending ear 190 which is connected by a link 192 to a corresponding rocker arm 194 on a rocker shaft 195. The rocker shaft 195 is journalled in a pair of spaced brackets 196 on the previously mentioned horizontal frame 138.

The rocker shaft 195 has an operating arm 198 that is operated by a long upright link 200 and, as shown in FIGS. 2A and 3, the lower end of the link 200 is operated by a rocker arm 202 on the previously mentioned shaft 72 that is rocked by the previously mentioned link 70. Thus, the conveyor units 180 of the feed conveyor are rocked in unison and rock in synchronism with the cycles of operation of the shuttle 40.

As shown in FIG. 3, each of the conveyor units 180 has a transverse ridge 214 adjacent its rear edge which prevents the fruit from rolling off the rear edge of the conveyor unit and which defines the rear portions of the seat 182 of the conveyor unit. The upper surface of each conveyor unit is divided into a rearward portion which includes the seats 182 and a formed portion of curved cross sectional configuration. It is to be noted that the rear portion of the surface of a conveyor unit 180 is inclined forwardly upwardly when the conveyor unit is in its rearward position shown in FIGS. 3 and 5, but inclines forwardly downward when the conveyor unit is rocked to its forward position shown in FIG. 6.

It is apparent that when the conveyor units 180 are at their forward limit positions shown in FIG. 6, the forward edges of the conveyor units cooperate with the back edges of adjacent conveyor units to form temporary V-shaped spaces or cradles in which the round fruit come to rest when the conveyor units swing to their forward positions. It is important to note that the temporary cradles are so formed and dimensioned that the center of gravity of a fruit therein is forward of the forward edge of the conveyor unit behind the fruit. Consequently, the forward edge of the conveyor unit can boost the fruit in the cradle only in a forward direction.

When the conveyor units 180 are subsequently rocked to their rearward limit positions shown in FIGS. 3 and 5, new fruit are boosted onto the seats 182 from the temporary cradles rearward of the seats. When the conveyor units again rock to their forward limit positions shown in FIG. 6, the newly received fruit roll forward into the cradles between conveyor units. Thus, as each conveyor unit 180 reaches its rearward limit position a fruit on the forward end of the conveyor unit is boosted forwardly onto a second conveyor unit and almost at the same time a new fruit roll onto the seat 182 of the first conveyor unit.

The oscillations of the conveyor units 180 are so synchronized with the cycle of operation of the gate 140 of the cyclic loader that immediately after the gate 140 returns to its fruit-holding position shown in FIG. 6 a new row of 20 fruit is advanced onto the 20 seats 132 of the transverse bar 130 for retention of the fruit by the gate.

It is to be noted that the relationships required to give the shuttle the capability of filling the carriers on the conveyor with no gaps caused by empty carriers are based on the following facts:

1. The carriers on the conveyor are uniformly spaced apart center-to-center by a given unit distance.
2. Each carrier travels the unit distance in a given unit of time.
3. The fruit holders on the shuttle are spaced apart center-to-center by said unit distance.
4. The advancing shuttle is accelerated to substantially the same velocity as the conveyor and when so accelerated the holders on the shuttle are adjacent corresponding carriers on the conveyor and at such time the objects on the shuttle are transferred simultaneously to the carriers on the conveyor.
5. The time required for a complete cycle of reciprocation of the shuttle is a particular number of said given units of time.
6. The number of holders on the shuttle is said particular number.

The description herein in specific detail of the presently preferred embodiment of the invention will suggest various changes, substitutions and other departures from the disclosure within the spirit and scope of the appended claims.

We claim:

1. In an apparatus to deliver objects sequentially to a zone, for example, a processing zone,
the combination of:
a continuously operating conveyor to move a single row of objects longitudinally of the row to said zone;
a reciprocating shuttle synchronized with the conveyor and making a stroke from a starting position in the direction of travel of the conveyor, which stroke accelerates to substantially the velocity of the conveyor;
cyclic holding means on the shuttle synchronized with the reciprocation of the shuttle to receive a row of the objects at the starting position of the shuttle and to release the row to the conveyor when the shuttle is accelerated to substantially the velocity of the conveyor;
cyclic supply means synchronized with the reciprocations of the shuttle to load the cyclic holding means on the shuttle at the starting positions of the shuttle;
a crank operatively connected to the shuttle to reciprocate the shuttle; and
a continuously-actuated epicyclic train synchronized with the conveyor to move the crank in an epicycloidal orbit.

2. A combination as set forth in claim 1 in which the range of reciprocation of the shuttle is less than half the length of the shuttle.

3. In an apparatus to deliver objects sequentially to a zone, for example, a processing zone,
the combination of:
a continuously operating conveyor to move a single row of objects longitudinally of the row to said zone with given spacing between the objects in the row;
a reciprocating shuttle synchronized with the conveyor and making a stroke from a starting position in the direction of travel of the conveyor, which stroke accelerates to substantially the velocity of the conveyor;
cyclic holding means on the shuttle synchronized with the reciprocation of the shuttle to receive a single feed row of the objects at the starting position of the shuttle to support the feed row of objects above the conveyor with said given spacing between the objects, and to release all the objects of the feed row onto the conveyor simultaneously when the shuttle is accelerated to substantially the velocity of the conveyor; and
cyclic supply means including gate means synchronized with the reciprocations of the shuttle to load the cyclic holding means on the shuttle at the starting positions of the shuttle, said conveyor having individual carriers for the objects to hold the row at said given spacing and the cyclic holding means of the shuttle comprising a row of individual cooperable jaw holders for the objects to maintain the feed row of objects at said given spacing, said jaw holders being movable toward and from each other in a direction transverse to the direction of movement of said shuttle.

4. In an apparatus of the character described to arrange objects in a travelling row, the combination of:
a conveyor having a row of uniformly spaced carriers for the individual objects with the carriers spaced apart center-to-center by a given unit distance and with each carrier travelling the given unit distance in a given unit of time;
a shuttle adjacent the conveyor and movable along a path parallel to the conveyor path between a retracted limit position and an advanced limit position;
a row of cooperable jaw holders on the shuttle spaced apart center-to-center by said unit distance;
means to reciprocate the shuttle cyclically between said two limit positions and in doing so to accelerate the shuttle from its retracted limit position to substantially the same velocity as the conveyor with the holders on the accelerated shuttle adjacent corresponding carriers on the conveyor,
the duration of the cycle of reciprocation of the shuttle being a particular number of said given units of time;
the number of holders in the row on the shuttle being said particular number;
means to load the holders on the shuttle with said objects during each cycle of reciprocation of the shuttle; and
means to transfer the row of objects on the holders of the accelerated shuttle to the corresponding carriers on the conveyor and comprising means to move said jaw holders in a direction transverse to the direction of movement of said shuttle.

5. In an apparatus to deliver objects sequentially to a zone, for example, a processing zone,
the combination of:

a continuously operating conveyor to move a single row of objects longitudinally of the row to said zone;

a reciprocating shuttle synchronized with the conveyor and making a stroke from a starting position in the direction of travel of the conveyor, which stroke accelerates to substantially the velocity of the conveyor;

cyclic holding means on the shuttle synchronized with the reciprocation of the shuttle to receive a row of the objects at the starting position of the shuttle and to release the row to the conveyor when the shuttle is accelerated to substantially the velocity of the conveyor;

cyclic supply means synchronized with the reciprocations of the shuttle to load the cyclic holding means on the shuttle at the starting positions of the shuttle;

a crank operatively connected to the shuttle to reciprocate the shuttle;

and a continuously actuated epicyclic train synchronized with the conveyor to move the crank in an epicycloidal orbit, said orbit being flattened at one end to cause the shuttle to make substantially a pause at its starting position without pause in the operation of the epicyclic train.

6. In an apparatus to deliver objects sequentially to a zone, for example, a processing zone, the combination of:

a continuously operating conveyor to move a single row of objects longitudinally of the row to said zone;

a reciprocating shuttle synchronized with the conveyor and making a stroke from a starting position in the direction of travel of the conveyor, which stroke accelerates to substantially the velocity of the conveyor;

cyclic holding means on the shuttle synchronized with the reciprocation of the shuttle to receive a row of the objects at the starting position of the shuttle and to release the row to the conveyor when the shuttle is accelerated to substantially the velocity of the conveyor;

cyclic supply means synchronized with the reciprocations of the shuttle to load the cyclic holding means on the shuttle at the starting positions of the shuttle;

a crank operatively connected to the shuttle to reciprocated the shuttle; and a continuously actuated epicyclic train synchronized with the conveyor to move the crank in an epicycloidal orbit, said train comprising:

a fixed sun gear;

a planet gear of the same diameter as the sun gear in mesh with the sun gear;

means the roll the planet gear around the sun gear, said crank being eccentrically positioned on the planet gear with the crank at minimum distance from the sun gear at one end of the orbit that corresponds to the starting position of the shuttle.

7. In an apparatus to deliver objects sequentially to a zone, for example, a processing zone, the combination of:

a continuously operating conveyor to move a single row of objects longitudinally of the row to said zone;

a reciprocating shuttle synchronized with the conveyor and making a stroke from a starting position in the direction of travel of the conveyor, which stroke accelerates to substantially the velocity of the conveyor;

cyclic holding means on the shuttle synchronized with the reciprocation of the shuttle to receive a row of the objects at the starting position of the shuttle and to release the row to the conveyor when the shuttle is accelerated to substantially the velocity of the conveyor;

cyclic supply means synchronized with the reciprocations of the shuttle to load the cyclic holding means on the shuttle at the starting positions of the shuttle;

a crank operatively connected to the shuttle to reciprocate the shuttle; and a continuously actuated epicyclic train synchronized with the conveyor to move the crank in an epicyclic orbit, said train being driven by the conveyor for synchronization with the conveyor.

8. A combination as set forth in claim 7 which includes a knee-action linkage operated by the crank, the linkage comprising two links pivotally interconnected at their inner ends, the outer end of one of the links being pivotally connected to the shuttle, the outer end of the other link being pivoted to fixed structure.

9. In an apparatus to deliver objects sequentially to a zone, for example, a processing zone, the combination of:

a continuously operating conveyor to move a single row of objects longitudinally of the row to said zone;

a reciprocating shuttle synchronized with the conveyor and making a stroke along a path from a starting position in the direction of travel of the conveyor, which stroke accelerates to substantially the velocity of the conveyor;

cyclic holding means on the shuttle synchronized with the reciprocation of the shuttle to receive a row of the objects at the starting position of the shuttle and to release the row to the conveyor when the shuttle is accelerated to substantially the velocity of the conveyor;

means including a stationary cam adjacent said path and a follower on said shuttle to actuate the cyclic holding means on the shuttle, and;

cyclic supply means synchronized with the reciprocations of the shuttle to load the cyclic holding means on the shuttle at the starting positions of the shuttle.

10. A combination as set forth in claim 9 in which said cam is a fixed barrel cam with its axis extending in the direction of reciprocation of the shuttle.

11. In an apparatus to deliver objects sequentially to a zone, for example, a processing zone, the combination of:

a continuously operating conveyor to move a single row of objects longitudinally of the row to said zone;

a reciprocating shuttle synchronized with the conveyor and making a stroke from a starting position in the direction of travel of the conveyor, which stroke accelerates to substantially the velocity of the conveyor;

cyclic holding means on the shuttle synchronized with the reciprocation of the shuttle to receive a row of the objects at the starting position of the shuttle and to release the row to the conveyor when the shuttle is accelerated to substantially the velocity of the conveyor;

said cyclic holding means comprising a row of holders for the individual objects, the row of holders comprising a row of first jaws and a cooperating row of second jaws;

rocker shaft means extending longitudinally of the shuttle to operate said jaws simultaneously;

means to actuate the shaft means including cam means responsive to the reciprocation of the shuttle; and cyclic supply means synchronized with the reciprocations of the shuttle to load the cyclic holding means on the shuttle at the starting positions of the shuttle.

12. A combination as set forth in claim 11 which includes a pair of rocker shafts extending longitudinally of the shuttle to actuate the row of first jaws; and a pair of rocker shafts extending longitudinally of the shuttle to actuate the row of second jaws.

13. A combination as set forth in claim 12 in which one shaft of each pair has a row of rocker arms pivotally connected to the jaws of the corresponding row of jaws;

and in which the other shaft of each pair has a row of rocker arms connected by links to the same jaws.

14. A combination as set forth in claim 13 in which one shaft of each of the pair of shafts is actuated by a first cam and a cooperating first follower, one of said cam and follower being fixed adjacent the path of reciprocation of the shuttle, the other of said cam and follower being mounted on the shuttle to travel therewith.

15. A combination as set forth in claim 13 in which one shaft of each pair of shafts is actuated by a cam and a cooperating follower, the cam and follower being spaced away from the path of reciprocation of the shuttle, in which the other shaft of each pair of shafts has an operating arm;

and in which the cam and follower are operatively connected to said operating arm by linkage outside the shuttle.

16. A combination as set forth in claim 15 which includes cam and follower means synchronized with the reciprocations of the shuttle;

and in which means including a rocker arm operatively connects the cam and follower means with the gate means.

17. In an apparatus to deliver objects sequentially to a zone, for example, a processing zone, the combination of:

a continuously operating conveyor to move a single row of objects longitudinally of the row to said zone;

a reciprocating shuttle synchronized with the conveyor and making a stroke from a starting position in the direction of travel of the conveyor, which stroke accelerates to substantially the velocity of the conveyor;

cyclic holding means comprising jaws mounted on the shuttle for translatory movement thereon and movable toward and from each other in synchronism with the reciprocation of the shuttle to receive a row of the objects at the starting position of the shuttle and to release the row to the conveyor when the shuttle is accelerated to substantially the velocity of the conveyor;

a cyclic loader for the cyclic holding means on the shuttle, said cyclic loader being synchronized with the reciprocations of the shuttle, said cyclic loader providing a row of N seats for the individual objects positioned above the starting position of the shuttle, the cyclic loader including gate means synchronized with the reciprocations of the shuttle to release the objects from the row of seats at substantially the starting position of the shuttle; and supply means to replenish the cyclic loader.

18. In an apparatus to deliver objects sequentially to a zone, for example, a processing zone, the combination of:

a continuously operating conveyor to move a single row of objects longitudinally of the row to said zone;

a reciprocating shuttle synchronized with the conveyor and making a stroke from a starting position in the direction of travel of the conveyor, which stroke accelerates to substantially the velocity of the conveyor;

cyclic holding means comprising jaws mounted on the shuttle for translatory movement thereon toward and from each other in synchronism with the reciprocation of the shuttle to receive a row of the objects at the starting position of the shuttle and to release the row to the conveyor when the shuttle is accelerated to substantially the velocity of the conveyor;

a cyclic loader for the cyclic holding means on the shuttle, said cyclic loader being synchronized with the reciprocations of the shuttle; and supply means to replenish the cyclic loader, said supply means including means to organize a supply of the objects into N longitudinal rows with the objects in the longitudinal rows forming transverse rows of N objects each, said supply means further including means synchronized with the cyclic loader to advance the longitudinal rows step by step towards the cyclic loader to present said transverse rows of objects successively to the loader.

19. A combination as set forth in claim 18 in which said organizing means includes:

a series of conveyor units extending transversely of the parallel longitudinal rows and arranged edge to edge in the direction of the parallel rows, each of said units having a plurality of spaced seats for the objects corresponding respectively to the parallel longitudinal rows; and means to rock the conveyor units to cause the articles of the parallel rows to progress step by step towards the cyclic loader.

20. A combination as set forth in claim 19 in which said single-row conveyor to said zone is power actuated;

and in which the shuttle and the cyclic supply means are operated by the single row conveyor for synchronization therewith.

21. In an apparatus to deliver objects sequentially to a zone, for example, a processing zone, the combination of:
a continuously operating conveyor to move a single row of objects longitudinally of the row to said zone;
a reciprocating shuttle synchronized with the conveyor and making a stroke from a starting position in the direction of travel of the conveyor, which stroke accelerates to substantially the velocity of the conveyor, said shuttle reciprocating above the single-row conveyor;
cyclic holding means comprising jaws mounted on the shuttle for translatory movement thereon toward and from each other in synchronism with the reciprocation of the shuttle to receive a row of the objects at the starting position of the shuttle and to release the row to the conveyor when the shuttle is accelerated to substantially the velocity of the conveyor,
said cyclic holding means on the shuttle comprising cooperating pairs of jaws operable between object holding states and release states,
said cyclic holding means including means to move the pairs of jaws between upper positions in holding states close enough to the cyclic loader to receive the objects dropped from the cyclic loader without damaging impact and lower positions in release state close enough to the level of the single-row conveyor to drop the objects on the single-row conveyor without damaging impact;
cyclic supply means synchronized with the reciprocations of the shuttle to load the cyclic holding means on the shuttle at the starting positions of the shuttle,
said cyclic supply means including a cyclic loader positioned above the starting position of the shuttle to replenish the shuttle.

22. A combination as set forth in claim 21 which includes means to move the jaws of each pair in individual orbits with the jaws moving at minimum spacing from their upper positions to their lower positions and then spreading apart to wider spacing to return to their upper positions.

23. A combination as set forth in claim 22 which includes means to adjust the minimum spacing of the jaws of the pairs for different size fruit.

* * * * *